J. W. HUFF & L. M. HORNER.
CARD GAME.
APPLICATION FILED JUNE 16, 1916.

1,259,987.

Patented Mar. 19, 1918.
2 SHEETS—SHEET 1.

Fig. 1.

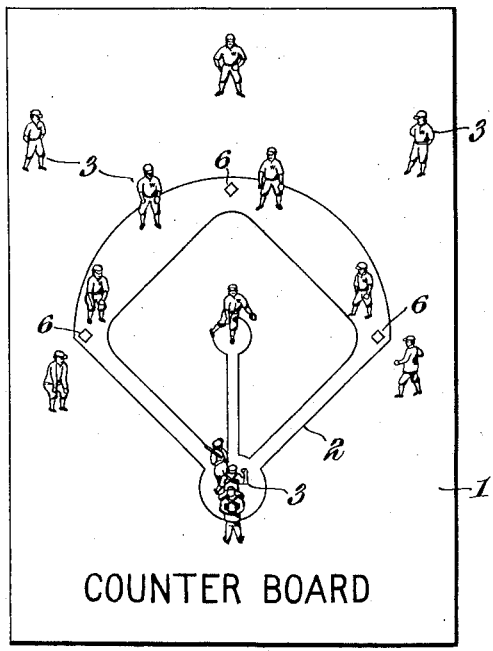

COUNTER BOARD

Fig. 1ª

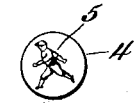

Fig. 2.

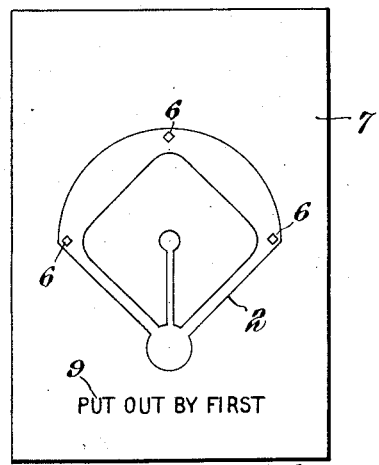

PUT OUT BY FIRST

Fig. 3.
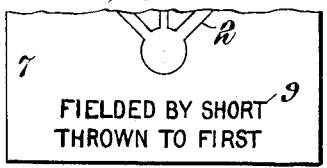
FIELDED BY SHORT
THROWN TO FIRST

Fig. 4.
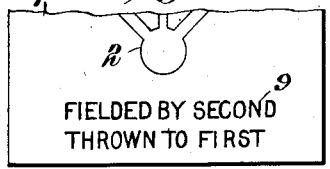
FIELDED BY SECOND
THROWN TO FIRST

Fig. 5.
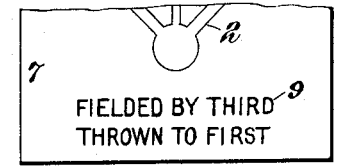
FIELDED BY THIRD
THROWN TO FIRST

Fig. 6.
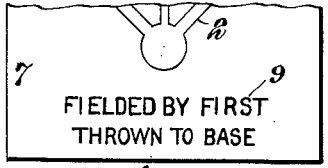
FIELDED BY FIRST
THROWN TO BASE

Fig. 7.
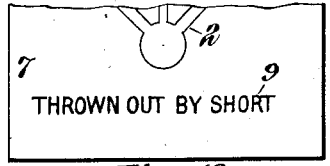
THROWN OUT BY SHORT

Fig. 8.
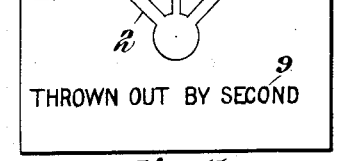
THROWN OUT BY SECOND

Fig. 9.
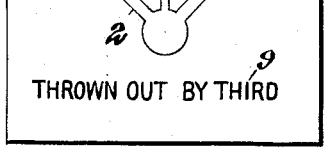
THROWN OUT BY THIRD

Fig. 10.
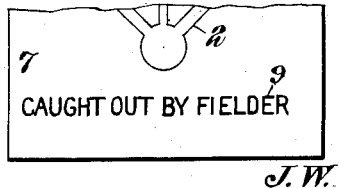
CAUGHT OUT BY FIELDER

Fig. 11.
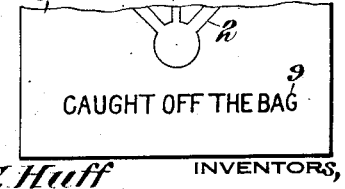
CAUGHT OFF THE BAG

WITNESSES
Howard D. Orr
H. J. Chapman

INVENTORS,
J. W. Huff
and L. M. Horner,
BY
E. G. Siggers.
ATTORNEY

J. W. HUFF & L. M. HORNER.
CARD GAME.
APPLICATION FILED JUNE 16, 1916.

1,259,987.

Patented Mar. 19, 1918.
2 SHEETS—SHEET 2.

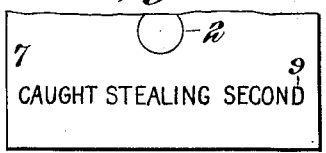
Fig. 12. CAUGHT STEALING SECOND

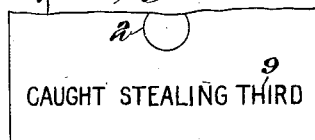
Fig. 13. CAUGHT STEALING THIRD

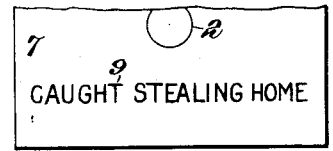
Fig. 14. CAUGHT STEALING HOME

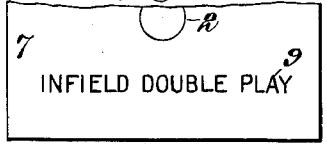
Fig. 15. INFIELD DOUBLE PLAY

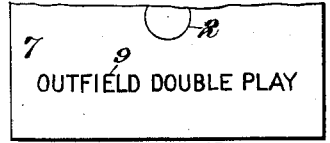
Fig. 16. OUTFIELD DOUBLE PLAY

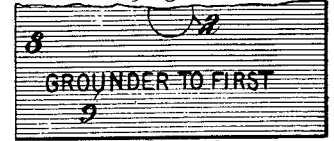
Fig. 17. GROUNDER TO FIRST

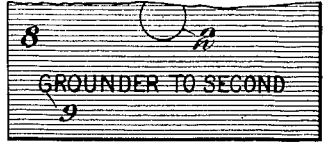
Fig. 18. GROUNDER TO SECOND

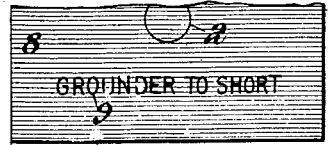
Fig. 19. GROUNDER TO SHORT

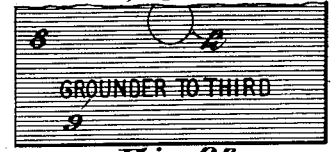
Fig. 20. GROUNDER TO THIRD

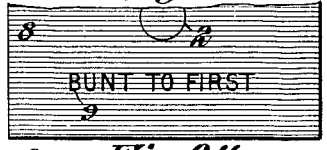
Fig. 21. BUNT TO FIRST

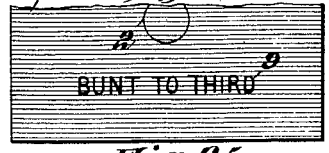
Fig. 22. BUNT TO THIRD

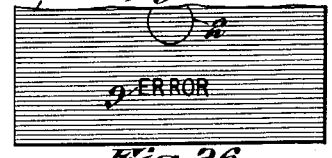
Fig. 23. ERROR

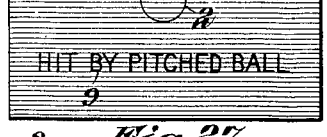
Fig. 24. HIT BY PITCHED BALL

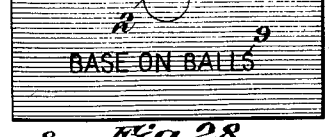
Fig. 25. BASE ON BALLS

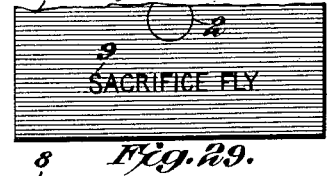
Fig. 26. SACRIFICE FLY

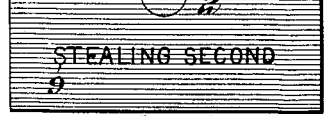
Fig. 27. STEALING SECOND

Fig. 28. STEALING THIRD

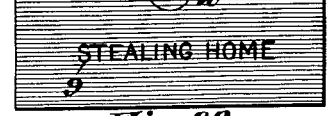
Fig. 29. STEALING HOME

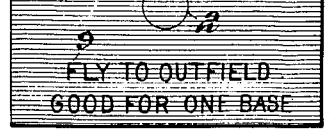
Fig. 30. FLY TO OUTFIELD GOOD FOR ONE BASE

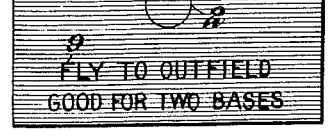
Fig. 31. FLY TO OUTFIELD GOOD FOR TWO BASES

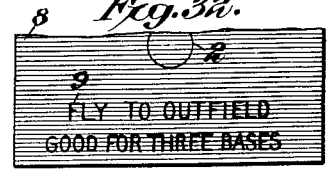
Fig. 32. FLY TO OUTFIELD GOOD FOR THREE BASES

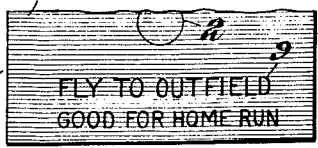
Fig. 33. FLY TO OUTFIELD GOOD FOR HOME RUN

WITNESSES
Howard D. Orr
H. T. Chapman

INVENTORS
J. W. Huff
and L. M. Horner
BY
E. G. Siggers
ATTORNEY

UNITED STATES PATENT OFFICE.

JOHN WALTER HUFF AND LINDSAY MERL HORNER, OF NIAGARA FALLS, NEW YORK.

CARD GAME.

1,259,987.  Specification of Letters Patent.  Patented Mar. 19, 1918.

Application filed June 16, 1916. Serial No. 104,063.

*To all whom it may concern:*

Be it known that we, JOHN W. HUFF and LINDSAY M. HORNER, citizens of the United States, residing at Niagara Falls, in the county of Niagara and State of New York, have invented a new and useful Card Game, of which the following is a specification.

This invention has reference to card games, and its object is to provide a game founded upon the game of baseball, but in which only a minimum number of cards are needed, so that the card game is made more interesting by being less prolonged than similar games as heretofore proposed.

In accordance with the present invention two sets or suits of cards are provided, one representing the offensive or batting side, and the other the defensive or fielding side, and in addition thereto there is provided another card constituting a counter board upon which is produced a figure of a base ball diamond about which small counters may be placed as the plays are made and the game progresses.

The cards of each suit or deck may be alike in general appearance, but the cards of one suit or deck may be differently colored from those of the other, or one deck may be white and the other colored, so that the two decks are readily distinguishable one from the other.

The cards of each deck may contain a representation of the diamond and arrangement of miniature figures similar to the counter board, but each card of each deck contains different legends, except that certain numbers of the cards are duplicates.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claim.

In the drawings:—

Figure 1 is a face view of the counter board drawn on an enlarged scale for clearness of illustration, since the counter board may be of the same size as the playing cards, and these latter may be of the same size as is customary in ordinary playing cards as used in a variety of games.

Fig. 1ª is a face view of one of the counters used on a counter board card to represent base runners.

Fig. 2 is a face view of one of the defensive cards containing an outline of the baseball diamond, but for simplicity of illustration omitting the figures of the players shown on the counter board of Fig. 1.

Figs. 3 to 16 are face views of the legend-containing portions of the cards belonging to the defensive suit or deck, but omitting all duplicates.

Figs. 17 to 33 are similar partial face views of the legend end of the cards of the offensive suit or deck, omitting duplicates.

Referring first to Figs. 1 and 1ª, there is shown a counter board 1 which may be considered as of the same size as the playing cards of the game, but for clearness of illustration is shown on a larger scale in the drawings. It will be understood, however, that the counter board may be initially larger than the cards of the game, although convenience demands that the counter board be of the same size as the cards. Upon the counter board there is printed a representation of a baseball diamond 2 with various figures 3 printed on the card in imitation of the players. There are also provided counters 4 which may be in the form of small disks each with a representation 5 of a base runner thereon to be moved from base to base of the counter board, the several bases being indicated at 6. The purpose and operation of the counter board 1 is so apparent as to need no extended description and the manner of using it will appear further on in considering the various plays and counter plays that may be made.

In Fig. 2 and associated figures there are shown playing cards 7 belonging to what may be termed the defensive suit or deck, and in Fig. 17 and associated figures portions only of offensive cards 8 are indicated, Figs. 3 to 16 also showing but parts of the cards. Upon the playing cards there are printed representations of base ball diamonds 2 with the bases 6, but omitting the representation of the men 3, which may or may not be printed on the cards.

On the lower portion or legend zone of each playing card there is a legend 9, the defensive suit or deck containing 15 different cards provided with as many different legends, but as in the full defensive deck certain of the cards are duplicated one or more times the defensive suit or deck or pack totals thirty-six cards.

The offensive suit, deck or pack contains seventeen different cards having as many different legends with some of the cards duplicated so that the entire pack of offensive cards numbers thirty-six cards. The two packs or decks therefore together number seventy-two cards, of which fifteen in one deck differ and seventeen in the other deck differ, so that the total number of different cards is thirty-two.

Any manner of distinguishing the two decks of cards from each other may be used, and these cards may be actually of different colors, or, as before stated, one deck may have entirely white cards and the other deck have colored cards, or may be otherwise distinguished. In the drawings it is assumed that in one deck all the cards are white with the base ball diamond and figures of men, if present, as well as the legends, printed in black, while the other deck has the faces of the cards colored with the imprints in black, and since the coloring need not be pronounced it may be in the form of a tint of any color which may be chosen. The cards of the two decks are, therefore, readily distinguishable by the characteristically different grounds upon which the imprints are produced.

In order to play the game, each opponent deals to the other; that is, the offensive player deals the defensive cards to the defensive player, and vice versa. Before dealing, the cards are thoroughly shuffled. Two, four or six persons can play the game, the players being evenly divided between the offensive and defensive sides. When more than two persons are playing the cards are dealt one at a time to each opponent, beginning with the opponent on the left of the dealer. When five cards have been dealt to each player, the remainder of each pack is placed on the table face downwardly to be drawn from as the game progresses. The deal passes to the left when four or six persons are playing, but, of course, care should be taken that the dealer deals the cards to the opponents only.

The play always starts with the first offensive player at the left of the dealer where four or six persons are playing, and with the offensive player when two persons are playing. The player having a knowledge of the game of base ball will know how each card in his hand should be played, the idea being to get as many on the bases as possible and advance the base runners, so as to score runs for his side. The card played is placed face upwardly in the center of the table, so that the defensive side may see what play has been made and determine what defensive card may be played against it. The player after playing a card will draw one card from the top of the offensive cards lying face downward, so as to replenish his hand to the quantity of five. This card should not be drawn until after the player has played his hand. Only in extreme cases does the offensive player not have in his hand a card which he can play and it is only in such cases that he is permitted to discard one card from his hand and draw a card from the pack until he can play.

The game and the manner of playing it will be best understood by considering the offensive cards with their explanations and uses, together with the defensive cards to be played against them.

Suppose the offensive card "Fly to outfield, good for one base" be played, the defensive card for such offensive card is "Caught by fielder." Should the defensive card not be played, the first card counts as a one base hit, placing the batter on first base and advancing any base runner who may be on the base at the time the fly is made. The advance of a base runner is only in case he is forced off the base on the play. The same condition exists as to the offensive card "Fly to outfield, good for two bases." The same defensive card is used as in the first example, but in case it is not played the batter advances to second base, and if there be a runner on first base he is advanced to third base, or a runner on second or third base scores a run.

The offensive card "Fly to outfield, good for three bases," counts similarly to the first two cards named and scores all base runners who may be on any base at the time the play is made.

Subject to the same conditions as before the offensive card "Fly to outfield, good for home run" scores the batter and all the base runners who may be on bases at the time the play is made, it being understood that in all these cases the offensive card is nullified if the defensive plays the card "Caught by fielder."

Or, in place of the defensive card "Caught by fielder," the defensive card "Outfield double play" may be substituted, provided there is a runner on base at the time the play is made, and then the second-named offensive card will count for two outs. No double play card can be played after two are out.

The defensive card "Infield double play"

can be played on any infield hit provided there are one or more runners already on bases, and it will then count for two outs, but such card cannot be played after two are out.

The offensive card "Stealing second" can be played by the offense in an attempt to advance a base runner already on first base to second base. The defensive card to be played against this play is "Caught stealing second," in which case the play counts for an out. Should such defensive card be not played, it is assumed that the attempted steal has been successful, and the base runner is moved from first to second base on the counter board.

With the offensive cards "Stealing third" and "Stealing home", the play is the same as before, while the play may be stopped by the defense cards "Caught stealing third" and "Caught stealing home".

The offensive card "Sacrifice fly" is the same as "Fly to outfield" except that it indicates that the batter has attempted to advance a runner already on base by sacrificing himself for an out. The base runner will accordingly be advanced one base upon the defense playing the card "Caught by fielder". If this defense card is not played, the play will go as a one base hit and the runner also advances one base. "Outfield double play" cannot be played against "Sacrifice fly".

"Base on balls" is played by the offensive side and indicates that the batter has been given a base on balls by the pitcher. There is no defensive card to be played on this offensive card. Therefore, to fortify the defense against such a play it may be assumed that base runners take a long lead off their bases, in which case the defense may play the card "Caught off the bag", which puts the base runner out, unless the offense in turn plays the "Error" card, in which case the base runner should be safe. An "Out" made on this play applies to the base runner nearest home. If the defense does not play the card marked "Caught off the bag", the play goes by default and the offense plays the next card.

The card marked "Hit by pitched ball" indicates that the batter has been hit by a ball thrown by the pitcher, and the same conditions apply in this play as in the case of the card "Base on balls".

The offensive card marked "Grounder to first" indicates that a grounder has been hit sharply to first base. The defense card to be played is either "Put out by first", or "Fielded by first thrown to base." The difference in these two defensive cards is that the first mentioned card indicates that the play has been completed perfectly, while the second means that the play has been simply started and can be offset by the offensive playing the "Error" card. If the defense make the play perfectly, it is assumed that the base runner nearest home is put out, provided such base runner is forced off his base by the play. If not, the play applies to the batsman.

The offensive card "Grounder to second", or "Grounder to short", or "Grounder to third" or "Bunt to first", or "Bunt to third" are all governed by the same rules which apply to the card marked "Grounder to first".

An "Error" card may be played by the offensive in any defensive play on which an error can be made. For example, "Fielded by third thrown to base". The "Error" card cannot be played on cards reading "Put out by first", second or third, as it is assumed that plays of this kind are completed perfectly. "Error" cards should not be played on "Caught by fielder" cards. An "Error" card may be played on the card "Caught off the bag".

Memorandum should be made at the close of each half inning of the number of runs scored by the batting side. That side having scored the most runs at the end of nine full innings is the winner. In case of a tie at the end of the ninth inning the game should be continued a necessary number of full innings until the winning run is scored.

By the game thus described all the monotonous details such as calling of strikes, and balls, the hitting of the ball to a certain part of the outfield, etc., are omitted, but this instead of detracting from the interest of the game, makes it more interesting, since the plays are of the interesting character that tends to keep the players' interest held to the highest pitch all through the game. Moreover, the cutting out of smaller details shortens the time of playing the game and makes it possible to play several games in an evening, and in much less time than is usually necessary to play card games founded upon base ball, as heretofore proposed.

The game of the present invention is highly scientific, as in playing the cards it is judgment and thought that wins the game rather than the mere chance of drawing a good hand.

What is claimed is:—

A base ball card game comprising a pack of seventy-two cards divided into two decks, both decks each being composed of thirty-six cards, the cards of one deck having seventeen of its number provided with legends distinguishable from each other, while the remaining cards of said deck bear legends duplicates of the legends of the first-named number of cards, and constitute the offensive suit, the cards of the other deck having fifteen of its number provided with legends differing from each other with the legends on the fifteen cards and constitute the defensive suit, a counter-board constituting a master card being of a size corresponding to the cards of the decks and having a representation of a base ball diamond with the figures of the players in their customary positions, and a movable object for traversing the counter-board and controlled by the offensive and defensive suits of cards when played from one player to another.

In testimony, that we claim the foregoing as our own, we have hereto affixed our signatures in the presence of two witnesses.

JOHN WALTER HUFF.
LINDSAY MERL HORNER.

Witnesses:
F. A. GAGE,
F. K. CONRAD.